US010434986B1

(12) United States Patent
Gilbert-Eyres et al.

(10) Patent No.: US 10,434,986 B1
(45) Date of Patent: Oct. 8, 2019

(54) SYSTEM AND METHOD TO SECURELY ACTIVATE A VEHICLE

(71) Applicant: GM GLOBAL TECHNOLOGY OPERATIONS LLC, Detroit, MI (US)

(72) Inventors: Matthew E. Gilbert-Eyres, Rochester Hills, MI (US); Matt Neely, Rochester, MI (US); Eric T. Hosey, Royal Oak, MI (US); Huong T. Chim, Madison Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/003,742

(22) Filed: Jun. 8, 2018

(51) Int. Cl.
*B60R 25/20* (2013.01)
*B60R 25/30* (2013.01)

(52) U.S. Cl.
CPC ........ *B60R 25/2036* (2013.01); *B60R 25/209* (2013.01); *B60R 25/2081* (2013.01); *B60R 25/30* (2013.01); *B60R 2325/20* (2013.01); *B60R 2325/40* (2013.01)

(58) Field of Classification Search
CPC ............ B60R 25/2036; B60R 25/2081; B60R 25/209; B60R 25/30
USPC ..... 340/425.5, 426.1, 426.35, 539.1, 539.11, 340/539.13
See application file for complete search history.

(56) References Cited

U.S. PATENT DOCUMENTS

2013/0304276 A1* 11/2013 Flies ...................... G06F 17/00
701/1

* cited by examiner

*Primary Examiner* — Daryl C Pope

(57) ABSTRACT

One general aspect includes a method of activating vehicle operations, the method including: (a) receiving, via a controller, a sequence of input signals from a plurality of device interfaces to define an activation attempt, where each device interface is configured to control operation of a corresponding vehicle aspect; (b) determining, via the controller, if the activation attempt matches an activation sequence key; and (c) activating vehicle operations, via the controller, when it is determined the activation attempt matches the activation sequence key.

18 Claims, 5 Drawing Sheets

SYSTEM AND METHOD TO SECURELY ACTIVATE A VEHICLE

Vehicle thefts often occur by a thief who has somehow obtained the vehicle owner's keys or keyfob. For example, untrustworthy family members can take keys without one's consent and knowledge and then use the vehicle for illicit purposes or savvy car thieves can clone one's keyfob and use the clone to steal their vehicle. It is therefore desirable to provide a system and method that will provide an additional layer of security to prevent thieves from being able to activate and steal a vehicle even when they have attained the vehicle's keys/keyfob.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method of activating vehicle operations, the method including: (a) receiving, via a controller, a sequence of input signals from a plurality of device interfaces to define an activation attempt, where each device interface is configured to control operation of a corresponding vehicle aspect; (b) determining, via the controller, if the activation attempt matches an activation sequence key; and (c) activating vehicle operations, via the controller, when it is determined the activation attempt matches the activation sequence key. Other embodiments of this aspect include corresponding computer systems, apparatus, and computer programs recorded on one or more computer storage devices, each configured to perform the actions of the methods.

Implementations may include one or more of the following features. The method further including, before step (a): (d) entering, via the controller, into a learning mode, the learning mode configured to recognize a sequence of input signals from the plurality of device interfaces as the activation sequence key; (e) receiving, via the controller, the sequence of input signals from the plurality of device interfaces while in the learning mode; (f) storing in a memory, via the controller, the sequence of input signals from the plurality of device interfaces as the activation sequence key; and (g) communicating, via the controller, the activation sequence key to a data center. The method where the device interface is configured to control operation of the corresponding vehicle aspect being a vehicle sideview mirror, vehicle cabin window, vehicle door lock, vehicle cabin light, or vehicle HVAC system. The method further including: (d) requesting, via the controller, at least one additional activation attempt be provided when it is determined the activation attempt does not match the activation sequence key; and (e) triggering, via the controller, a theft alert notification after a predefined number of provided activation attempts are determined not to match the activation sequence key. The method where the activation sequence key is stored in a memory within the vehicle, and where the activation sequence key was previously downloaded to the memory from a data center. The method further including: (d) allowing, via the controller, a data center to activate vehicle operations even if it is determined the activation attempt does not match the activation sequence key. The method further including: after step (b) but before step (c), when it is determined that the activation attempt matches the activation sequence key: (d) determining, via the controller, whether a configuration of one or more vehicle aspect settings match a vehicle setting key; and (e) move to step (c) only when it is determined that the one or more vehicle aspect settings configurations match the vehicle setting key. The method where the one or more vehicle aspect settings configurations correspond to a vehicle HVAC system. Implementations of the described techniques may include hardware, a method or process, or computer software on a computer-accessible medium.

One general aspect includes a method of activating vehicle operations, the method including: (a) entering, via a controller, into a learning mode, the learning mode configured to recognize and store a sequence of input signals from a plurality of device interfaces as an activation sequence key, where each device interface is configured to control operation of at least a vehicle sideview mirror, vehicle cabin window, vehicle door lock, vehicle cabin light, or vehicle HVAC system; (b) receiving, via the controller, the sequence of input signals from the plurality of device interfaces while in the learning mode; (c) storing in a memory, via the controller, the sequence of input signals from the plurality of device interfaces as the activation sequence key; (d) communicating, via the controller, the activation sequence key to a remotely located data center; (e) receiving, via the controller, another sequence of input signals from the plurality of device interfaces to define an activation attempt; (f) determining, via the controller, if the activation attempt matches the activation sequence key; (g) when it is determined the activation attempt matches the activation sequence key, determining, via the controller, whether a configuration of one or more vehicle aspect settings match a stored vehicle setting key; (h) when it is determined the configuration of the one or more vehicle aspect settings match the stored vehicle setting key, via the controller, activating vehicle operations; and (i) allowing, via the controller, a data center to activate vehicle operations even if it is determined the configuration of the one or more vehicle aspect settings do not match the stored vehicle setting key. Other embodiments of this aspect include corresponding computer systems, apparatus, and computer programs recorded on one or more computer storage devices, each configured to perform the actions of the methods.

One general aspect includes a system for the secured activation of vehicle operations, the system including: a memory configured to include one or more executable instructions and a controller configured to execute the executable instructions, where the executable instructions enable the controller to: receive a sequence of input signals from a plurality of device interfaces to define an activation attempt, where each device interface is configured to control operation of a corresponding vehicle aspect; determine if the activation attempt matches an activation sequence key; and activate vehicle operations when it is determined the activation attempt matches the activation sequence key. Other embodiments of this aspect include corresponding computer systems, apparatus, and computer programs recorded on one or more computer storage devices, each configured to perform the actions of the methods.

Implementations may include one or more of the following features. The system where the executable instructions further enable the controller to: enter into a learning mode configured to recognize a sequence of input signals from the plurality of device interfaces as the activation sequence key; receive the sequence of input signals from the plurality of device interfaces while in the learning mode; and store in a memory the sequence of input signals from the plurality of device interfaces as the activation sequence key. The system where the executable instructions further enable the controller to communicate the activation sequence key to a data center. The system where the device interface is configured to control operation of the corresponding vehicle aspect being a vehicle sideview mirror, vehicle cabin window, vehicle door lock, vehicle cabin light, or vehicle HVAC system. The system where the executable instructions further enable the controller to trigger a theft alert notification after a predefined number of provided activation attempts are determined not to match the activation sequence key. The system where the activation sequence key is stored in a memory within the vehicle, and where the activation sequence key was previously downloaded to the memory from a data center. The system where the executable instructions further enable the controller to allow a data center to activate vehicle operations if the controller is to determine that the activation attempt does not match the activation sequence key. The system where the executable instructions further enable the controller to, when it is determined that the activation attempt matches the activation sequence key: determine whether a configuration of one or more vehicle aspect settings match a vehicle setting key; and activate vehicle operations only when it is determined that the one or more vehicle aspect settings configurations match the vehicle setting key. The system where the one or more vehicle aspect settings configurations correspond to a vehicle HVAC system. Implementations of the described techniques may include hardware, a method or process, or computer software on a computer-accessible medium.

The above features and advantages and other features and advantages of the present teachings are readily apparent from the following detailed description for carrying out the teachings when taken in connection with the accompanying drawings.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present system and/or method. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In today's world, a majority of vehicles are stolen after the thief has somehow obtained the vehicle's keys or keyfob. For example, family members can take one's keys without their consent and knowledge and then use the vehicle for a joy ride or the like. In an alternative example, car thieves can clone one's remote keyfob and use the fob to steal another's vehicle. As such, these kinds of situations can cause anxiety for a vehicle owner, especially when they have untrustworthy family members and/or live in high crime areas. However, if their vehicle requests a control interface security sequence be provided within the vehicle cabin prior to vehicle operations (i.e., a sequence of inputs from the power door lock switches, power window switches, sideview mirror orientation controllers, cabin light switches, etc.), then this anxiety can be relieved since those of questionable character won't be able to operate the vehicle even if they obtain the vehicle's key/keyfob. Moreover, anxiety can be further reduced in that a theft alert notification (TAN) can be provided to the vehicle owner and/or stolen vehicle services can be applied to the vehicle when someone else provides several incorrect security sequences while attempting to activate vehicle operations.

Implementing this security sequence option, in one or more embodiments, can occur in multiple parts. First, the vehicle owner will teach a vehicle their personal activation sequence while their vehicle is in a learning mode. Then, once the sequence has been properly applied, the security sequence will be activated such that all future vehicle activation attempts will require the security sequence before activation. Furthermore, the vehicle's telematics unit will transmit the activated security sequence to the backend to be stored in the owner's personal profile.

Figure 1:
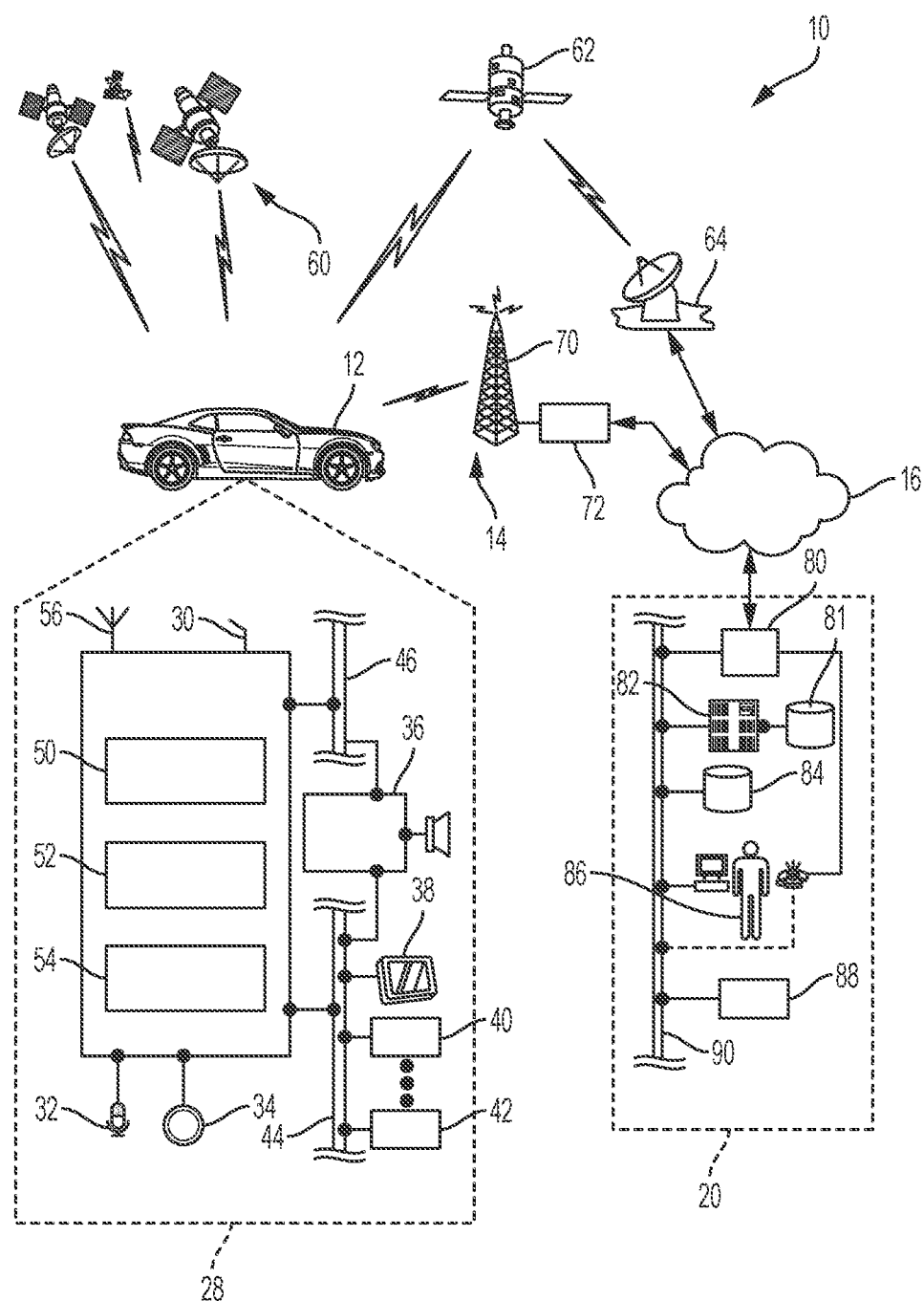
FIG. 1 is a block diagram depicting an exemplary embodiment of a communications system that is capable of utilizing the system and method disclosed herein.

With reference to FIG. 1, there is shown an operating environment that includes, among other features, a mobile vehicle communications system 10 and that can be used to implement the method disclosed herein. Communications system 10 generally includes a vehicle 12, one or more wireless carrier systems 14, a land communications network 16, and a data center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including, but not limited to, motorcycles, trucks, busses, sports utility vehicles (SUVs), recreational vehicles (RVs), construction vehicles (e.g., bulldozers), trains, trolleys, marine vessels (e.g., boats), aircraft, helicopters, amusement park vehicles, farm equipment, golf carts, trams, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit 30 such as, for example, the microphone 32 and pushbutton(s) 34, whereas others are indirectly connected using one or more network connections, such as a communications bus 44 or an entertainment bus 46. Examples of suitable network connections include a controller area network (CAN), WIFI, Bluetooth and Bluetooth Low Energy, a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket transceiver device that is installed in the vehicle and that enables wireless voice and/or data communication over wireless carrier system 14 and via wireless networking. This enables the vehicle to communicate with data center 20, other telematics-enabled vehicles, or some other entity or device. The telematics unit 30 preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor 86 or voice response unit at the data center 20) and data communication (e.g., to provide GPS location data or vehicle diagnostic data to the data center 20), the system can utilize a single call over a voice channel and switch as needed between voice and data transmission over the voice channel, and this can be done using techniques known to those skilled in the art.

According to one embodiment, telematics unit 30 utilizes cellular communication according to standards such as LTE or 5G and thus includes a standard cellular chipset 50 for voice communications like hands-free calling, a wireless modem for data transmission (i.e., transceiver), an electronic processing device 52, at least one digital memory device 54, and an antenna system 56. It should be appreciated that the modem can either be implemented through software that is stored in the telematics unit and is executed by processor 52, or it can be a separate hardware component located internal or external to telematics unit 30. The modem can operate using any number of different standards or protocols such as, but not limited to, WCDMA, LTE, and 5G. Wireless networking between vehicle 12 and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Telematics Controller 52 (processor) can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Telematics Controller 52 executes various types of digitally-stored instructions, such as software or firmware programs stored in memory 54, which enable the telematics unit to provide a wide variety of services. For instance, controller 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services provided in connection with one or more vehicle system modules 42 (VSM); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit 30 is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to data center 20 or other remote computer system for other purposes, such as fleet management. Also, new or updated map data can be downloaded to the GPS module 40 from the data center 20 via the telematics unit 30.

Apart from the audio system 36 and GPS module 40, the vehicle 12 can include other VSMs 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests.

As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module (BCM) that governs various electrical components located throughout the vehicle, like the vehicle's power door locks, vehicle side view mirrors and orientation thereof, vehicle cabin lights, the vehicle heating, ventilation, and air conditioning system (HVAC), telematics unit 30, and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. Vehicle electronics 28 also includes a number of device interfaces that provide the vehicle operator with a means of controlling one or more vehicle aspects such as, but not limited to, a sideview mirror directional pad (FIG. 4), cabin window switches (FIG. 4), window lock switch (FIG. 4), door lock switch (FIG. 4), and cabin light switch (FIG. 5). As used herein, the terms 'vehicle user interface' and 'device interface' broadly include any suitable form of electronic device, including both hardware and software components, which is located on the vehicle and enables a vehicle user to communicate with or through a component of the vehicle (e.g., sideview mirrors, cabin windows, power locks, window locks, or cabin lights). Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art.

The pushbutton(s) 34 allow manual user input into the telematics unit 30 to initiate wireless telephone calls and provide other data, response, or control input. Separate pushbuttons can be used for initiating emergency calls versus regular service assistance calls to the data center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM, media streaming services (e.g., PANDORA RADIO™, SPOTIFY™, etc.), satellite radio, CD, DVD, and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions (i.e., capable of GUI implementation). Audio system 36 may also generate at least one audio notification to announce such third-party contact information is being exhibited on display 38 and/or may generate an audio notification which independently announces the third-party contact information. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more cellular network infrastructures (CNI) 72, as well as any other networking components required to connect wireless carrier system 14 with land network 16. Each cell tower 70 includes sending and receiving antennas and a base station, with the base stations from different cell towers being connected to the CNI 72 either directly or via intermediary equipment such as a base station controller. Cellular system 14 can implement any suitable communications technology, including for example, analog technologies such as AMPS, or the newer digital technologies such as, but not limited to, 4G LTE and 5G. As will be appreciated by skilled artisans, various cell tower/base station/CNI arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to data center 20. For example, land network 16 may include a public switched telephone network (PSTN) such as that used to provide hardwired telephony, packet-switched data communications, and the Internet infrastructure (i.e., a network of interconnected computing device nodes). One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, data center 20 need not be connected via land network 16, but could include wireless telephony equipment so that it can communicate directly with a wireless network, such as wireless carrier system 14.

Data center 20 is designed to provide the vehicle electronics 28 with a number of different system backend functions (a couple of which are discussed below) and, according to the exemplary embodiment shown here, generally includes one or more switches 80, servers 82, databases 84, live advisors 86, as well as an automated voice response system (VRS) 88, all of which are known in the art. These various data center components are preferably coupled to one another via a wired or wireless local area network 90. Switch 80, which can be a private branch exchange (PBX) switch, routes incoming signals so that voice transmissions are usually sent to either the live adviser 86 by regular phone, backend computer 87, or to the automated voice response system 88 using VoIP. Server 82 can incorporate a data controller 81 which essentially controls the operations of server 82. Server 82 may control data information as well as act as a transceiver to send and/or receive the data information (i.e., data transmissions) from one or more of the data bases 84, telematics unit 30, and mobile computing device 57.

Controller 81 is capable of reading executable instructions stored in a non-transitory machine readable medium and may include one or more from among a processor, a microprocessor, a central processing unit (CPU), a graphics processor, Application Specific Integrated Circuits (ASICs), Field-Programmable Gate Arrays (FPGAs), state machines, and a combination of hardware, software and firmware components. The live advisor phone can also use VoIP as indicated by the broken line in FIG. 1. VoIP and other data communication through the switch 80 is implemented via a modem (i.e., a transceiver), connected between the land communications network 16 and local area network 90.

Data transmissions are passed via the modem to server 82 and/or database 84. Database 84 can store account information such as vehicle dynamics information and other pertinent subscriber information. Data transmissions may also be conducted by wireless systems, such as 802.11x, GPRS, and the like. Although the illustrated embodiment has been described as it would be used in conjunction with a manned data center 20 using live advisor 86, it will be appreciated that the data center can instead utilize VRS 88 as an automated advisor or, a combination of VRS 88 and the live advisor 86 can be used.

METHOD

Figure 2:
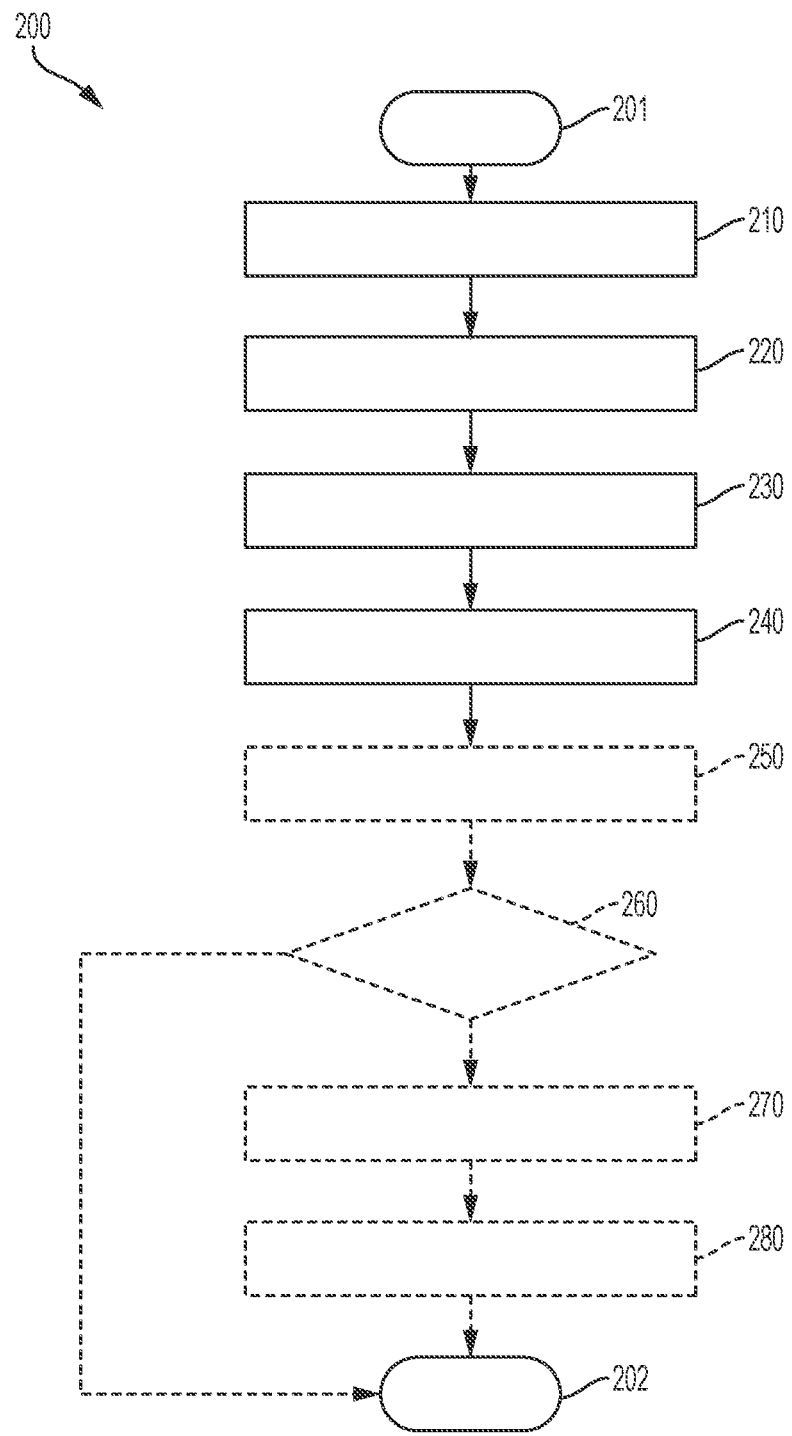
FIG. 2 is a flow chart for an exemplary methodology to establish an activation sequence for a vehicle.

Now turning to FIG. 2, there is shown an embodiment of method 200 to establish an activation sequence (i.e., security sequence) for the secure activation of a vehicle and, in one or more embodiments, to be added to a user profile stored in database at data center (FIG. 1). One or more aspects of establishment method 200 may be completed through vehicle telematics unit (FIG. 1) and one or more device interfaces located in the cabin of the vehicle. One or more ancillary aspects of method 200 may also be completed through database.

Method 200 is supported by telematics unit 30 being configured to communicate with data center 20 via wireless carrier system (FIG. 1). This configuration may be established by a vehicle manufacturer at or around the time of the telematics unit's assembly or after-market (e.g., via vehicle download using the afore-described communication system or at a time of vehicle service, just to name a couple of examples). Moreover, in at least one implementation, one or more instructions are provided to the telematics unit 30 and stored on non-transitory computer-readable medium (e.g., memory device). Method 200 is further supported by pre-configuring data center to store in database one or more user profiles and one or more activation sequences, each of which being operatively accessible via server.

Figure 3:
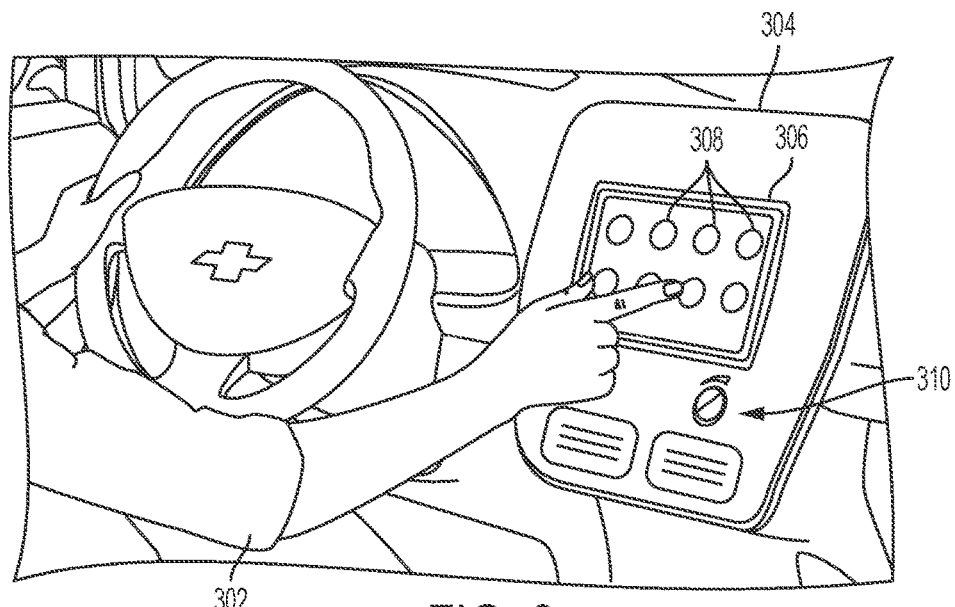
FIG. 3 shows a perspective view of one or more exemplary aspects of the exemplary methodology of FIG. 2.

Method 200 begins at 201 in which a vehicle owner (user) enters into and is situated in the cabin of the vehicle. In step 210, with additional reference to FIG. 3, the user 302 will put the telematics unit 304 in a learning mode through an infotainment screen 306. To do this, user 302 may enter a security code into the infotainment screen 306 via a number of virtual buttons 308. For example, when prompted, user 302 may enter a number of integers (e.g., letters and numbers) to enable telematics unit 304 to enter in to the learning mode. In step 220, telematics unit 304 will enter into the learning mode. Moreover, the learning mode allows the telematics unit 304 to recognize a desired sequence of input signals from various device interfaces, positioned around the vehicle interior, as an activation sequence key.

Figure 4:
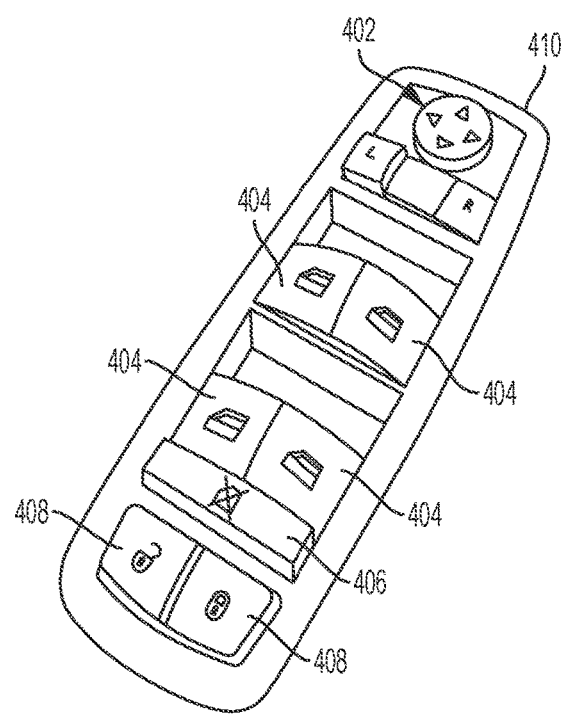
FIG. 4 shows a perspective view of one or more other exemplary aspects of the exemplary methodology of FIG. 2.
Figure 5:
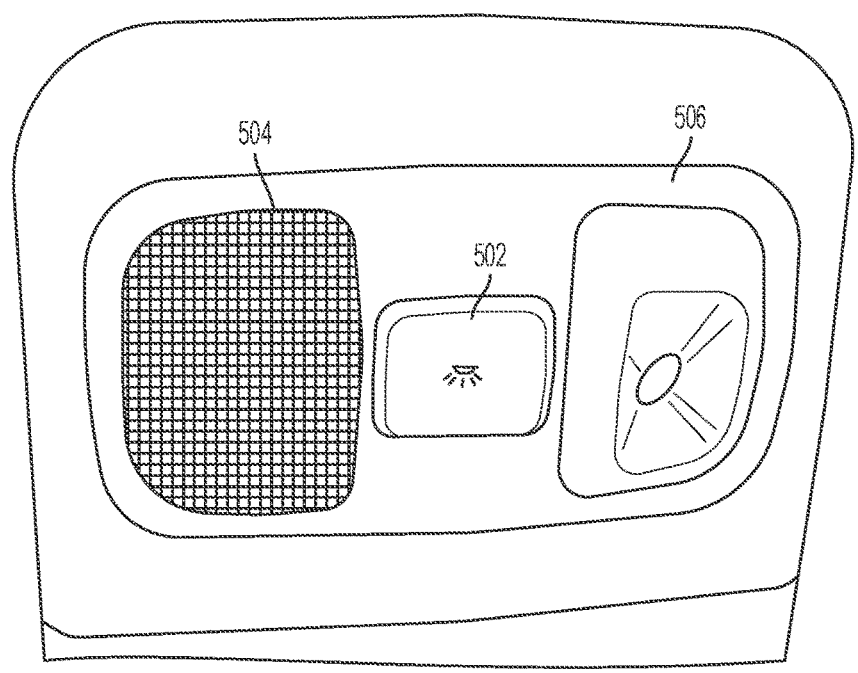
FIG. 5 is a perspective view of one or more other exemplary aspects of the exemplary methodology of FIG. 2.

In step 230, with additional reference to FIGS. 4 and 5, the user will activate one or more of the device interfaces in a desired sequence to establish the activation sequence key. As such, to create the activation sequence, the user may press the sideview mirror directional pad 402 (which can selectively orient both the driver and passenger sideview mirrors), one or more of the vehicle cabin window switches 404 (which can control the positioning of the driver-side window and front and back passenger-side windows), the window lock switch 406 (which can remove control of the front and back passenger-side windows by one or more vehicle passengers), or the vehicle door lock switch 408 (which can control the power locks for each of the vehicle doors), each of which can be located on the vehicle cabin control module 410. In addition, the user may press the cabin light switch 502 (which can control one or more of the cabin's interior lights of lighting system 504), which can be located on a ceiling panel 506 in the vehicle cabin. It should be understood that other device interfaces may be used in the desired sequence which establishes the activation sequence key (e.g., vehicle entertainment system switches, cruise control switches, or other of the numerous interfaces generally found on the vehicle steering wheel, etc.).

As follows, the activation sequence key may reflect a desired sequence that consists of any number of combinations of the device interfaces. Moreover, the activation sequence key may reflect a desired sequence with a desired number device interface inputs per se (e.g., one (1) input, five (5) inputs, eight (8) inputs, etc.). One activation sequence key may, for instance, reflect a desired sequence that includes: first pressing forward on the sideview mirror directional pad 402, pressing down on the driver side window switch 404, pressing down on the cabin light switch 502, pressing down on the door lock switch 408, and then pressing left on the sideview mirror directional pad 402. Additionally, in this step, while in learning mode, telematics unit may request the user repeat the desired device interface sequence one or more additional times for verification purposes.

In step 240, the telematics unit will save the desired sequence of device interfaces as the activation sequence key by storing the key onto the digital memory device. In this step, moreover, the telematics unit can be enabled to request an activation sequence attempt be provided upon vehicle startup (i.e., requested when the keys are turned in the ignition or the keyfob is present when the push-start button has been pressed). In optional step 250, telematics unit will communicate the activation sequence key to data center (FIG. 1) over wireless carrier system (FIG. 1). Furthermore, in this step the data center will associate the activation sequence key to the profile of the vehicle owner and store the activation sequence key to that profile. As follows, when the user purchases one or more future vehicles, the activation sequence key can be downloaded to the telematics unit(s) of the future vehicle(s) and the telematics unit(s) can be enabled to request a proper activation sequence before activation of those vehicles.

In optional step 260, while remaining in learning mode, the telematics unit will ask if the user desires to add an additional layer of security as a settings match verification (SMV) protection. If the user desires to add a layer of SMV protection to support the activation sequence processes, method 200 will move to optional step 270; otherwise method 200 will move to completion 202. In optional step 270, a vehicle setting key is created. The vehicle setting key lets the telematics unit know that an additional vehicle setting needs to be in place while the activation sequence attempt is being carried out and before vehicle activation can occur.

At this point, the telematics unit will request the user sets one or more vehicle aspects to a certain setting to create the vehicle setting key. For example, with additional reference returning to FIG. 3, the user may rotate the heating, ventilation and air conditioning (HVAC) blower intensity knob 310 all the way to the right (as shown), such that the released air will be provided at full blast. As follows, when SMV protection is added, when an activation sequence attempt occurs, even in the activation attempt matches the stored activation sequence key, vehicle activation will not occur unless the additional vehicle settings are set in place to match the vehicle settings key. (For instance, the activation sequence attempt will only work if the HVAC intensity knob is set at full blast.)

In optional step 280, telematics unit will save the vehicle settings key by storing the key onto the digital memory device (FIG. 1). In this step, moreover, telematics unit may communicate the vehicle settings key to the data center to, for example, associate the vehicle settings key to the profile of the vehicle owner and store the activation sequence key to that profile. After step 280, method 200 will move to completion 202.

Figure 6:
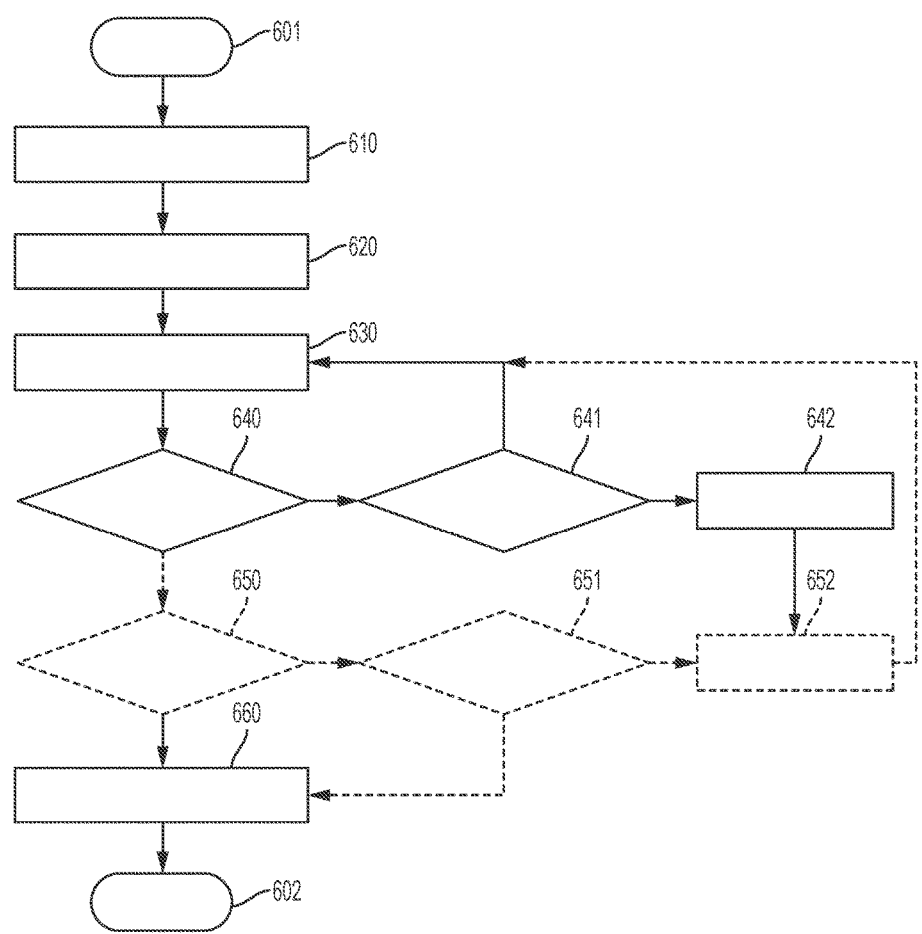
FIG. 6 is a flow chart for an exemplary methodology to activate a vehicle.

Now turning to FIG. 6, there is shown an embodiment of method 600 to activate a vehicle. One or more aspects of activation method 600 may be completed through the telematics unit (FIG. 1) and one or more device interfaces (FIGS. 3-5) located in the cabin of the vehicle. Method 600 is supported by telematics unit being configured to communicate with data center (FIG. 1) via wireless carrier system (FIG. 1). This configuration may be established by a vehicle manufacturer at or around the time of the telematics unit's assembly or after-market (e.g., via vehicle download using the afore-described communication system or at a time of vehicle service, just to name a couple of examples). Moreover, in at least one implementation, one or more instructions are provided to the telematics unit and stored on non-transitory computer-readable medium (e.g., memory device). Method 600 is further supported by preconfiguring data center to store in database one or more user profiles being operatively accessible via server (FIG. 1).

Method 600 begins at 601 in which a vehicle owner (user) is situated in the cabin of the vehicle and desires to activate their vehicle. In step 610, the user turns the vehicle power on by inserting their key into the ignition switch or by pressing the activation button while their keyfob is in the vehicle interior. In this step, the vehicle will enter into an accessory mode (ACC) such that battery power will be provided to electronic components within the vehicle interior (e.g., the telematics unit, the device interfaces, etc.) and may also be provided to the vehicle headlamps and taillights. However, while in this ACC mode, the vehicle engine will not be activated and thus will remain in an off state. In step 620, the telematics unit requests the user to activate the device interfaces in a sequence which is identical to the sequence reflected in the stored activation sequence key. This request may, for example, be embodied as a notification that is displayed on the infotainment screen (FIG. 3) and may state: "PLEASE PROVIDE SECURITY SEQUENCE AT THIS TIME" or the like.

In step 630, the user provides their activation attempt by activating the device interfaces in a sequence that may be believed to match the stored activation sequence key. For instance, the user may provide an activation attempt that reflects, in the following order, the forward direction was pressed on the sideview mirror directional pad (FIG. 4), the driver side window switch (FIG. 4) was pressed down, the cabin light switch (FIG. 5) was pressed down, the door lock switch (FIG. 4) was pressed down, and the right direction was pressed on the sideview mirror directional pad (FIG. 4). As discussed above, moreover, the activation sequence key may be previously downloaded to the memory from a user profile at the data center.

In step 640, the telematics unit determines if the sequence of input signals from the device interfaces, which define the activation attempt, matches the stored activation sequence key. The telematics unit will also, in this step, establish a counter and begin counting the number of activation attempts provided by the user. As such, if the activation attempt and activation sequence key match, method 600 will move to optional step 650; otherwise, when the activation attempt does not match the activation sequence key, telematics unit will add one (1) to the counter number and method 600 will move to step 641. In one or more other embodiments, the activation sequence key may be stored at the data center and may be sent to the telematics unit when making a determination on whether the activation attempt matches the activation sequence key. Alternatively, it has been envisioned that telematics unit may send the activation attempt information to data center for the match determination to occur at the backend.

Furthermore, in this step, in those situations when the activation attempt and the key do not match, the telematics unit will request an additional activation attempt be provided by the user. This request may, for example, be embodied as a notification that is displayed on the infotainment screen. (As should be noted—in the above instance, method 600 would move to step 641 because the right direction was indicated as being pressed down on the sideview mirror directional pad and thus the activation attempt would not match the activation sequence key.)

In step 641, the telematics unit will determine if the number of previously provided activation attempts has reached the established maximum number for the counter (e.g., five (5) attempts). If the number of provided activation attempts has, in fact, reached the established maximum number, method 600 will move to step 642; otherwise method 600 will return to step 630 and allow the user to provide another activation attempt.

In step 642, since the predefined maximum number of provided activation attempts has been determined not to match the activation sequence key, the telematics unit may communicate with the data center and request data center trigger a theft alert notification (TAN) system. In one embodiment, as is generally known, this TAN system will send a notification to a mobile computing device (not shown) found to be owned by the user (i.e., via the user profile at data center). The notification may, for instance, be an SMS message or email that states: "PLEASE BE AWARE—MULTIPLE ATTEMPTS TO ACTIVATE YOUR VEHICLE HAVE FAILED" or the like.

Depending on the set preferences, the notification may also be a voice call from a live advisor (FIG. 1). In one or more embodiments, the TAN system or some other backend feature can also power down the vehicle so that power is removed from the vehicle interior. In one or more embodiments, the TAN system or some other backend feature can also retrieve the location of the vehicle (i.e., via its GPS module) and provide the coordinates of the vehicle to a remote part such as, for example, the nearest police department. After step 642 is complete, method 600 will move to step 652.

As should be understood, the mobile computing device is a smart phone, personal laptop computer, smart wearable device, or tablet computer having two-way communication capabilities, a netbook computer, or any suitable combinations thereof. The mobile computing device can include, amongst other things, computer processing capability and a transceiver capable of communicating with wireless carrier system 14. Examples of the mobile computing device include the iPhone™ manufactured by Apple, Inc. and the Pixel™ manufactured by HTC, Inc. as well as others.

In optional step 650, the telematics unit will determine if the additional SMV protection layer has been activated. If SMV protection is active, method 600 will move to step 651; otherwise, method 600 will move to step 660. In optional step 651, the telematics unit determines if the proper vehicle aspect(s) is/are at a setting that matches the stored vehicle setting key. For example, if the if the HVAC intensity knob is set at full blast (while the activation attempt is being performed). If the vehicle setting(s) match the vehicle setting key, method 600 will move to step 660; otherwise, method 600 will move to optional step 652. In one or more embodiments, the vehicle setting key may be stored at the data center and may be sent to the telematics unit when making a determination on whether the vehicle setting(s) match the vehicle setting key. Alternatively, it has been envisioned that telematics unit may send the vehicle setting(s) information to data center for the match determination to occur at the backend. After step 660, method 600 will move to completion 602.

In step 652, since the vehicle setting(s) are determined to not match the vehicle setting key, the telematics unit will cause the vehicle to remain in ACC mode. In this step, the telematics unit may also provide a notification that is displayed on the infotainment screen and may state: "PLEASE CORRECT YOUR SETTINGS TO ALLOW THE SECURITY SEQUENCE TO WORK PROPERLY AND TRY AGAIN" or the like. Upon completion of this optional step, method may return to step 630 to allow the user a chance to provide their activation attempt after they have corrected the vehicle setting(s).

In step 660, the vehicle will be fully activated by turning on the vehicle engine to conduct normal driving operations (i.e., since it has ultimately been determined the activation attempt matches the activation sequence key and, optionally, the vehicle setting(s) match the vehicle setting key). It should be understood that at any step in method 600, especially steps 640-642, a live advisor at data center can be allowed to override the activation sequence process and fully activate the vehicle even if one or more provided activation attempts do not match the stored activation sequence key. In order to remotely activate the vehicle, for instance, the live advisor may be required to verify the identity of the user and may ask other personal information of the user to verify their identity before this kind of activation.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the system and/or method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for," or in the case of a method claim using the phrases "operation for" or "step for" in the claim.

What is claimed is:

1. A method of activating vehicle operations, the method comprising:
    (a) receiving, via a controller, a sequence of input signals from a plurality of device interfaces to define an activation attempt, wherein each device interface is configured to control operation of a corresponding vehicle aspect, wherein the vehicle aspect is a vehicle sideview mirror, vehicle cabin window, vehicle door lock, vehicle cabin light, or vehicle HVAC system;
(b) determining, via the controller, if the activation attempt matches an activation sequence key; and
(c) activating vehicle operations, via the controller, when it is determined the activation attempt matches the activation sequence key.

2. The method of claim 1, further comprising, before step (a):
(d) entering, via the controller, into a learning mode, the learning mode configured to recognize a sequence of input signals from the plurality of device interfaces as the activation sequence key;
(e) receiving, via the controller, the sequence of input signals from the plurality of device interfaces while in the learning mode; and
(f) storing in a memory, via the controller, the sequence of input signals from the plurality of device interfaces as the activation sequence key.

3. The method of claim 2, further comprising (g) communicating, via the controller, the activation sequence key to a data center.

4. The method of claim 1, further comprising: (d) requesting, via the controller, at least one additional activation attempt be provided when it is determined the activation attempt does not match the activation sequence key.

5. The method of claim 4, further comprising: (e) triggering, via the controller, a theft alert notification after a predefined number of provided activation attempts are determined not to match the activation sequence key.

6. The method of claim 1, wherein the activation sequence key is stored in a memory within the vehicle, and wherein the activation sequence key was previously downloaded to the memory from a data center.

7. The method of claim 1, further comprising: (d) allowing, via the controller, a data center to activate vehicle operations even if it is determined the activation attempt does not match the activation sequence key.

8. The method of claim 1, further comprising: after step (b) but before step (c), when it is determined that the activation attempt matches the activation sequence key:
(d) determining, via the controller, whether a configuration of one or more vehicle aspect settings match a vehicle setting key; and
(e) move to step (c) only when it is determined that the one or more vehicle aspect settings configurations match the vehicle setting key.

9. The method of claim 8, wherein the one or more vehicle aspect settings configurations correspond to a vehicle HVAC system.

10. A method of activating vehicle operations, the method comprising:
(a) entering, via a controller, into a learning mode, the learning mode configured to recognize and store a sequence of input signals from a plurality of device interfaces as an activation sequence key, wherein each device interface is configured to control operation of at least a vehicle sideview mirror, vehicle cabin window, vehicle door lock, vehicle cabin light, or vehicle HVAC system;
(b) receiving, via the controller, the sequence of input signals from the plurality of device interfaces while in the learning mode;
(c) storing in a memory, via the controller, the sequence of input signals from the plurality of device interfaces as the activation sequence key;
(d) communicating, via the controller, the activation sequence key to a remotely located data center;
(e) receiving, via the controller, another sequence of input signals from the plurality of device interfaces to define an activation attempt;
(f) determining, via the controller, if the activation attempt matches the activation sequence key; and
(g) when it is determined the activation attempt matches the activation sequence key, determining, via the controller, whether a configuration of one or more vehicle aspect settings match a stored vehicle setting key;
(h) when it is determined the configuration of the one or more vehicle aspect settings match the stored vehicle setting key, via the controller, activating vehicle operations; and
(i) allowing, via the controller, a data center to activate vehicle operations even if it is determined the configuration of the one or more vehicle aspect settings do not match the stored vehicle setting key.

11. A system for the secured activation of vehicle operations, the system comprising:
a memory configured to comprise one or more executable instructions and a controller configured to execute the executable instructions, wherein the executable instructions enable the controller to:
receive a sequence of input signals from a plurality of device interfaces to define an activation attempt, wherein each device interface is configured to control operation of a corresponding vehicle aspect, wherein the vehicle aspect is a vehicle sideview mirror, vehicle cabin window, vehicle door lock, vehicle cabin light, or vehicle HVAC system;
determine if the activation attempt matches an activation sequence key; and
activate vehicle operations when it is determined the activation attempt matches the activation sequence key.

12. The system of claim 11, wherein the executable instructions further enable the controller to:
enter into a learning mode configured to recognize a sequence of input signals from the plurality of device interfaces as the activation sequence key;
receive the sequence of input signals from the plurality of device interfaces while in the learning mode; and
store in a memory the sequence of input signals from the plurality of device interfaces as the activation sequence key.

13. The system of claim 12, wherein the executable instructions further enable the controller to communicate the activation sequence key to a data center.

14. The system of claim 11, wherein the executable instructions further enable the controller to trigger a theft alert notification after a predefined number of provided activation attempts are determined not to match the activation sequence key.

15. The system of claim 11, wherein the activation sequence key is stored in a memory within the vehicle, and wherein the activation sequence key was previously downloaded to the memory from a data center.

16. The system of claim 11, wherein the executable instructions further enable the controller to allow a data center to activate vehicle operations if the controller is to determine that the activation attempt does not match the activation sequence key.

17. The system of claim 11, wherein the executable instructions further enable the controller to, when it is determined that the activation attempt matches the activation sequence key:

determine whether a configuration of one or more vehicle aspect settings match a vehicle setting key; and activate vehicle operations only when it is determined that the one or more vehicle aspect settings configurations match the vehicle setting key.

18. The system of claim 17, wherein the one or more vehicle aspect settings configurations correspond to a vehicle HVAC system.

\* \* \* \* \*